United States Patent [19]

Hartzler

[11] 3,876,662

[45] Apr. 8, 1975

[54] 1,3-DITHIOLE DERIVATIVES FROM ACETYLENIC COMPOUNDS SUBSTITUTED WITH AT LEAST ONE ELECTRON-WITHDRAWING GROUP AND CARBON DISULFIDE

[75] Inventor: Harris Dale Hartzler, Wilmington, Del.

[73] Assignee: E. I. du Pont de Nemours and Company, Wilmington, Del.

[22] Filed: June 6, 1973

[21] Appl. No.: 367,879

Related U.S. Application Data

[62] Division of Ser. No. 47,111, June 17, 1970, abandoned.

[52] U.S. Cl............. 260/327 M; 260/240 R; 106/3
[51] Int. Cl............................................ C07d 71/00
[58] Field of Search ..................... 260/327 M, 240

[56] References Cited
UNITED STATES PATENTS 3,758,503    9/1973    Hartzler.............................. 260/327

3,781,281    12/1973    Hartzler.............................. 260/240

OTHER PUBLICATIONS

Krespan, et al., J. Org. Chem. 33: 1850–1854 (1968).

*Primary Examiner*—Henry R. Jiles
*Assistant Examiner*—C. M. S. Jaisle

[57] ABSTRACT

Acetylenic compounds $R^1C \equiv CR^2$, in which at least one of the $R^1$ and $R^2$ substituents is an electron-withdrawing group react with carbon disulfide to give dithiole compounds of three different formulas, their ratio depending on the reaction parameters. In the presence of a coreactant HX, a dithiole substituted with the X group in the 2-position is formed. In the presence of a carboxylic acid or of an ethylenic compound, acetylenic compounds $R^1C \equiv CR^1$ react with carbon disulfide to form other 2-substituted dithioles. The novel compounds of this invention are useful in removing tarnish from silverware.

9 Claims, No Drawings

1,3-DITHIOLE DERIVATIVES FROM ACETYLENIC COMPOUNDS SUBSTITUTED WITH AT LEAST ONE ELECTRON-WITHDRAWING GROUP AND CARBON DISULFIDE

RELATED APPLICATION

This application is a division of U.S. Ser. No. 47,111 filed June 17, 1970, now abandoned.

BACKGROUND OF THE INVENTION

1. Field of the Invention

This invention relates to novel 1,3-dithiole derivatives, which are obtained from carbon disulfide and certain acetylenic compounds, optionally in the presence of selected coreactants.

2. Prior Art

Krespan and England, *J. Org. Chem. Soc.*, 33, 1852 (1968) reported the formation of the compound

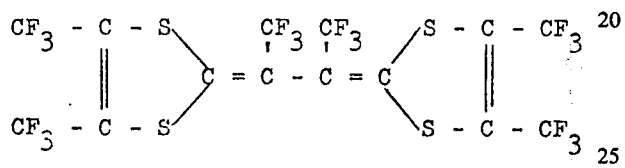

by a reaction of hexafluoro-2-butyne with sulfur and carbon disulfide at 200°C.

Acetylene itself is known to react with carbon disulfide, giving thiophene.

SUMMARY OF THE INVENTION

It has now been discovered, according to the present invention, that acetylenic compounds of the formula $$R^1C \equiv CR^2,$$

in which
- $R^1$ is an electron-withdrawing group, such as carboxyl, alkoxycarbonyl of up to 12 carbon atoms, aryloxycarbonyl of up to 13 carbon atoms (including the carbonyl carbon), lower perfluoroalkyl, arylcarbonyl of up to 13 carbon atoms (including the carbonyl carbon), or the cyano group; and
- $R^2$ is either the same as $R^1$ or hydrogen, a $C_1$–$C_5$ alkyl, aryl of up to 12 carbon atoms, or alkaryl of up to 12 carbon atoms react with carbon disulfide to give products having the following formulas (1), (2), and (3), their ratio depending on the reaction conditions.

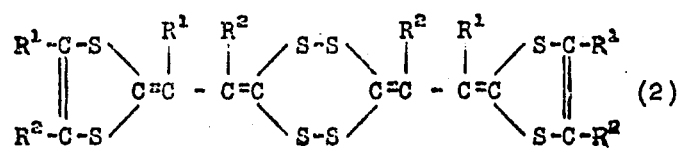

(1)

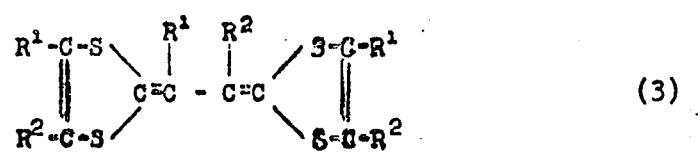

(2)

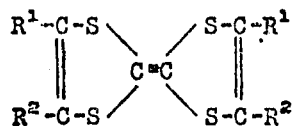

(3)

In the presence of a coreactant HX, the substituted 1,3-dithiole of formula (4) is formed

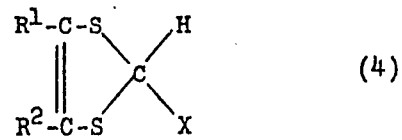

(4)

In the above formulas X can be one of the following groups:

a. lower alkoxyl;

b. o- or p-hydroxyphenyl, optionally substituted with up to two groups, which individually can be halogen, lower alkyl, lower alkoxyl, alkoxycarbonyl of up to 12 carbon atoms, benzoyl, hydroxyl, the nitro group or the cyano group;

c. —CO(CH=CH)$_n$R$^3$, wherein $n$ is 0 or 1 and $R^3$ is aryl of up to twelve carbons or alkaryl of up to twelve carbons, both optionally substituted with halogen, lower alkoxyl, lower alkoxycarbonyl, benzoyl, the nitro group, or the cyano group;

d.

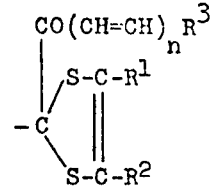

where $R^1$, $R^2$, $R^3$, and $n$ are as defined above; and e.

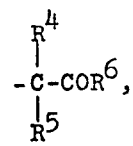

where
- $R^4$ is hydrogen, lower alkyl, or aryl of up to twelve carbons;
- $R^5$ is hydrogen, lower alkyl, lower alkanoyl, or aryl of up to twelve carbons;

$R^6$ is hydrogen, lower alkyl, aryl of up to twelve carbons, or alkaryl of up to twelve carbons; but $R^4$ and $R^6$ taken together can be alkylene of from two to twelve carbons.

Substituted acetylenes of the formula $R^1C\equiv CR^1$, wherein $R^1$ has the above-defined meaning, react with carbon disulfide in the presence of a carboxylic acid HZ, in which Z is an aroyloxy group or an alkanoyloxy group of up to 13 carbon atoms, or in the presence of ethylenic compounds having the formula $CH_2=CHR^7$, in which $R^7$ is hydrogen, lower alkyl, an alkanoyloxy group of up to 13 carbon atoms, or phenyl. The products obtained in the above reactions can be represented by the following formula (5)

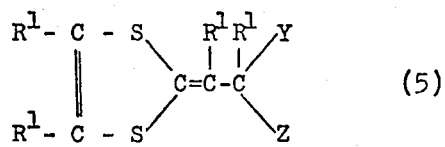

where

Y, individually, is hydrogen;

Z, individually, is an aroyloxy group or an alkanoloxy group of up to 13 carbon atoms; or Y and Z taken together are

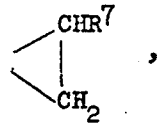

$R^7$ being defined above.

The products of this invention are useful for removal of tarnish from silverware.

DETAILED DESCRIPTION OF THE INVENTION

While all the products of the present invention have one or more 1,3-dithiole rings in their molecules, their structures vary with either the starting materials or the reaction parameters. Among the simpler reaction products are those shown by formulas (4) and (5), above.

Compounds having the general formula (4) are formed in a reaction of an acetylenic compound $R^1C\equiv CR^2$ with carbon disulfide and a coreactant HX; $R^1$, $R^2$, and X having been defined above. Depending on the nature of X, the coreactant HX can be a lower alcohol, a phenol with at least one unsubstituted ortho or para position, an aldehyde or ketone containing at least one α-hydrogen, benzaldehyde or a derivative thereof, or cinnamaldehyde or a derivative thereof. The term "lower alcohol" means an aliphtatic alochol having up to five carbon atoms.

Representative HX coreactants include methyl alcohol, ethyl alcohol, propyl alcohol, isopropyl alcohol, butyl alcohol (all isomers) amyl alcohol (all isomers), 2-chlorophenol, 4-chlorophenol, 2,6-dichlorophenol, 4-bromophenol, m-cresol, o-cresol, 2,3-dimethylphenol, 3,5-dimethylphenol, 2,4-dimethylphenol, p-ethylphenol, p-methoxyphenol, o-ethoxyphenol, p-propoxyphenol, methyl salicylate, ethyl salicylate, methyl p-hydroxybenzoate, butyl m-hydroxybenzoate, resorcinol, hydroquinone, catechol, p-nitrophenol, m-nitrophenol, o-nitrophenol, salicylonitrile, p-hydroxybenzonitrile, 2-hexylphenol, 2-bromophenol, 3-fluorophenol, 4-iodophenol, 4-chloro-3-fluorophenol, 5-butyl-2-chlorophenol, 3,5-xylenol, 2-isopropyl5-methylphenol, 2,6-dichlorophenol, m-isopropoxyphenol, and butyl salicylate.

HX can further be, for example, acetaldehyde, 2-methylpropanal, propionaldehyde, valeraldehyde, heptanal, dodecanal, tridecanal, acetone, methyl ethyl ketone, diethyl ketone, butyl ethyl ketone, dihexyl ketone, acetophenone, ethyl phenyl ketone, diphenyl ketone, propyl naphthyl ketone, butyl anthryl ketone, cyclopentanecarboxaldehyde, cyclopentanone, cyclohexanone, cycloheptanone, benzophenone, phenyl naphthyl ketone, 2-ethyl-4-methylpentanal, phenylacetaldehyde, 1-(2-naphthyl)-2-butanone, α,α-diphenylacetophenone, 2-methyl-3-hexanone, 2,2-dimethyl-3-heptanone, 8-pentadecanone, 5-methyl-2,4-hexanedione, 7-methyl-2,4-nonanedione, 3-methyl-2,4-pentanedione, 2,6-dimethyl-3,5-heptanedione, 5,5-dimethyl-2,4-hexanedione, 2-acetonaphthone, 3-phenylacetophenone, 4-methylpropiophenone, 3-ethylacetophenone, 2,4,6-trimethylacetophenone, 4-t-pentylacetophenone, cyclobutanone, p-hydroxybenzophenone, 3-methylcyclopentanone, cyclododecanone, 3-isopropylcyclohexanone, and 3-ethyl-5-methylcyclohexanone.

HX can also be benzaldehyde, cinnamaldehyde, naphthaldehyde, anthraldehyde, naphthylvinylaldehyde, and anthrylvinylaldehyde; as well as their substituted derivatives in which the substituents can be, for example, chlorine, bromine, iodine, fluorine, methoxyl, ethoxyl, propoxyl, isopropoxyl, pentoxyl, isopentoxyl, methoxycarbonyl, ethoxycarbonyl, butoxycarbonyl, isobutoxycarbonyl, pentoxycarbonyl, benzoyl, the nitro group, or the cyano group.

Such substituted aldehydes include, for example, the following compounds: 3,5-dimethylbenzaldehyde, 2-phenylbenzaldehyde, p-(sec-butyl)benzaldehyde, 2,4,6-triethylbenzaldehyde, p-isopropylcinnamaldehyde, o-methylcinnamaldehyde, p-phenylcinnamaldehyde, 2-naphthaleneacrolein, 4-isopropyl-1,6-dimethylnaphthaldehyde, 5-nitro-1-naphthaldehyde, p-ethoxycinnamaldehyde, m-chlorobenzaldehyde, o-isopentyloxybenzaldehyde, m-cyanobenzaldehyde, p-methoxycarbonylbenzaldehyde, o-nitrobenzaldehyde, and p-benzoylbenzaldehyde.

$R^2$ can be a lower alkyl, such as methyl, ethyl, propyl, isopropyl, butyl, isobutyl, sec-butyl, tert-butyl, amyl, and isoamyl; an aryl, such as phenyl, α-naphthyl, β-naphthyl, or anthryl; or alkaryl, such as o-tolyl, m-tolyl, p-tolyl, xylyl, duryl, ethylphenyl, a methylnaphthyl, an ethylnaphthyl, or propylphenyl.

$R^2$ can, in addition, be the same as $R^1$, which is, among others, methoxycarbonyl, ethoxycarbonyl, phenoxycarbonyl, naphthoxycarbonyl, anthryloxycarbonyl, trifluoromethyl, pentafluoroethyl, heptafluoropropyl, benzoyl, toluoyl, naphthoyl, or anthranoyl. As stated earlier, $R^1$ and $R^2$ can also be carboxyl or the cyano group.

Acetylenic compounds which are suitable as starting materials for the practice of this invention include, among others, the following: hexafluoro-2-butyne, dimethyl acetylenedicarboxylate, diethyl acetylenedicarboxylate, methyl propiolate, ethyl propiolate, propiolic acid (2-propynoic acid), tetrolic acid (2-butynoic acid), 2-octynoic acid, phenylpropiolic acid, m-tolylpropiolic acid, 1-naphthylpropiolic acid, 4-biphenylylpropiolic acid, ethyl tetrolate, butyl phenylpropiolate, phenyl propiolate, 3,3,3-trifluoropropyne, 3,3,4,4,4-pentafluoro-1-butyne, 1,1,1-trifluoro-2-butyne, 1,1,1-trifluorophenylpropyne, 3-butyn-2-one, 1-hexyn-3-one, 4-octyn-3-one, 3-undecyn-2-one, 4-phenyl-3-butyn-2-one, 1-phenyl-2-hexyn-1-one, 1-phenyl-1-decyn-3-one, 1-naphthyl-2-propyn-1-one, 1-(2,4,6-trimethylphenyl)-3-phenylpropyn-1-one, 1,3-diphenylpropynone, propiolonitrile, 2-heptynenitrile, acetylenedicarboxylic acid, hexyl acetylenedicarboxylate, phenyl acetylenedicarboxylate, perfluoro-2-heptyne, 3-hexyne-2,5-dione, 5-decyne-4,7-dione, 1,4-butyne-2-butyne1,4-dione, 1,4-bis(3,5-xylyl)-2-butyne-1,4-dione, 1,4-di-p-tolyl-2-butynedione, and acetylenedicarbonitrile (dicyanoacetylene or butynedinitrile).

Preparation of compounds of Formula (4) does not require exact stoichiometric amounts of the starting materials. In practice, excess of both carbon disulfide and the coreactant is preferred. Although a tenfold, or even higher, excess of either one of these two starting materials can be used, it is not practical to exceed the $CS_2 : R^1C \equiv CR^2$ or $HX : R^1C \equiv CR^2$ molar ratio of 2:1 to 3:1.

The reaction is carried out at a temperature of about 45°–150°C. The rate of reaction decreases with decreasing temperatures, and the reaction is quite slow at aboutt 30°C. Temperatures above 150°C. can be used, but it is not advisable to exceed about 200°C. because of thermal instability of the products.

This reaction can be run at either normal pressure or at superatmospheric or subatmospheric pressure. Because of the high volatility of carbon disulfide and of the volatility of certain acetylenic compounds and of the HX coreactants, it is convenient to conduct this process at autogeneous pressure in a closed system. However, the process is not limited to batch operations and can, at sufficiently high pressures and temperatures, be adapted to continuous operations. Under autogeneous pressures, within the preferred temperature range, the reaction time varies from several hours to several days.

No solvent need be added to the reaction mixture, but excess carbon disulfide or HX reactant serves at the same time as the reaction solvent. Unsubstituted aliphatic esters, ethers or nitriles also can be used as solvents.

Compounds of Formula (5) can be prepared by contacting an acetylenic compound, $R^1C \equiv CR^1$, and carbon disulfide with a lower alkanoic acid, an arenecarboxylic acid, or alkarencarboxylic acid of up to 13 carbon atoms. A "lower alkanoic acid" for the purpose of this invention is an alkanoic acid having no more than six carbon atoms. Typical carboxylic acids which are useful in this process include: formic, acetic, propionic, butyric, isobutyric, pentanoic, hexanoic, benzoic, 1- and 2-naphthoic, anthranoic, o-, m-, and p-toluic, dimethylbenzoic, ethylbenzoic, 8-methyl-1-naphthoic, 2,4,6-triethylbenzoic, 4-pentylbenzoic, trimethylacetic, α-ethylbutyric, and ethylnaphthoic acids.

The reaction product will have the formula (5), above, in which Y is hydrogen, and Z is the alkanoyloxy or aroyloxy group derived from the starting acid.

Reaction of an acetylenic compound $R^1C \equiv CR^1$ with carbon disulfide and an ethylenic compound $CH_2=CHR^7$ leads to the product having the formula (5), in which Y and Z taken together form the group

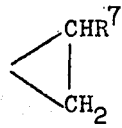

The radical $R^7$ can be, among others, a lower alkyl, such as methyl, ethyl, propyl, isopropyl, butyl, isobutyl, sec-butyl, tert-butyl, or pentyl (all isomers). It also can be a lower alkanoyloxy group, such as formoyloxy, acetoxy, propionoxy, butanoyloxy, pentanoyloxy, and various isomers of the last two named radicals. $R^7$ can also be hydrogen or phenyl. Representative ethylenic compounds include: vinyl butyl ether, vinyl 2-ethylhexyl ether, vinyl 1-isopropyl-2-methylpropyl ether, vinyl acetate, vinyl isobutrate, vinyl heptanoate, propylene, isobutylene, and 1-heptene.

The process conditions are similar to those discussed above in connection with compounds of formula (4), and the effects of process variables are comparable.

Products of formulas (1), (2), and (3) are made by contacting an acetylenic compound $R^1C \equiv CR^2$ with carbon disulfide. By varying the conditions, any one of these types can be formed predominantly or exclusively.

The formation of Type (1) can be favored by adding a lower alkanoic acid or a lower haloalkanoic acid to the system as a promoter or catalyst. Such an acid will have a $pK_a$ (in an aqueous solution, at 25°C.) of less than about five. The lower the $pK_a$, i.e., the stronger the acid, the higher will be the yield of a product of Formula (1). "Haloalkanoic" includes monohaloalkanoic and polyhaloalkanoic, including perhaloalkanoic. The preferred halogen substituents, for economic reasons, are fluorine and chlorine. Suitable acids, together with their $pK_a$'s, include formic acid (3.75), acetic acid (4.76), isovaleric acid (4,77), iodoacetic acid (3.18), α-bromopropionic acid (2.97), difluoroacetic acid (1.24) and trichloroacetic acid (0.92). The $pK_a$ values of many such acids (or $K_a$ values, from which $pK_a$ can easily be calculated) are given, for example, in "Handbook of Organic Structural Analysis," Ed. Yukawa (Benjamin, 1965), pages 614 ff. Also, see the discussion following Example 23, below.

The acid concentration usually is maintained between about 0.1 mole and 1 mole per mole of the acetylenic compound. The catalytic effect of the acid is still perceptible at molar ratios as low as about 0.01:1. Although any large amount of the acid can be used, there is no advantage to exceed the molar ratio of about 3:1.

In the absence of a carboxylic acid catalyst, compounds of Formulas (2) and (3) are the principal products. Carbon disulfide is usually present in a larger than equimolar amount with the acetylenic compound. A small excess of carbon disulfide favors the formation of a product of Formula (3), while a larger excess (e.g., 5–10 moles of $CS_2$ for each mole of the acetylenic compound) favors the formation of a product of Formula (2). The effects of temperature, pressure, and reaction time are comparable with those discussed above in connection with compounds having the formula (4).

This invention is now illustrated by the following representative examples of certain preferred embodiments thereof.

All the experiments described in the examples were carried out in sealed glass or stainless-steel tubes. After the stated period of heating, the tubes were cooled before being opened. All temperatures are in °C. In pressure measurements, the term "torr" is equivalent to millimeters of mercury. In nuclear magnetic measurements (nmr) data, the numbers in brackets refer to relative intensities. Infrared absorption spectra of liquids were taken on the pure materials; spectra of solids were determined on potassium bromide discs. In the infrared data, the absorption frequencies are in cm.$^{-1}$, and terms (s), (m) and (w) correspond to strong, medium and weak absorption. In the ultraviolet absorption data, "nm" stands for nanometers and "sh" means a shoulder.

EXAMPLE 1

4,5-Bis(trifluoromethyl)-2-methoxy-1,3-dithiole
(Formula 4; $R^1=R^2=CF_3$; $X = OCH_3$)

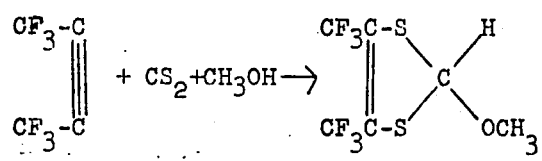

A mixture of 15 ml. of carbon disulfide, 15 ml. of methanol, and 16 g. of hexafluoro-2-butyne was heated at 100° for 2 days. Distillation of the product gave 5.6 g. (21%) of 4,5-bis(trifluoromethyl)-2-methoxy-1,3-dithiole which boiled at 80° at 24 torr, $n_D^{25}$ 1.4255.

Anal. Calcd. for $C_6H_2F_6OS_2$: C, 26.27; H, 1.49; S, 23.73; F, 42.19 Found: C, 26.64; H, 1.46; S, 23.78; F, 42.26

$F^{19}$ nmr: Singlet at +3138 c.p.s. from trihclorofluoromethane.

$H^1$ nmr: Singlets at $\delta 3.09$ [3] and $\delta 6.43$ [1].

IR: Double bond (>C=C<) absorption at 1595 cm.$^{-1}$.

UV: In isooctane, $\lambda$sh 287 ($\epsilon$3210), 269 ($\epsilon$3910) and 212 nm ($\epsilon$3670).

Mass spectrum:

| m/e | Intensity | Assignment |
|---|---|---|
| 270 | 4320 | Parent |
| 251 | 1710 | P-F |
| 239 | 224,900 | P-OCH₃ |
| 201 | 385 | P-CF₃ |
| 194 | 692 | 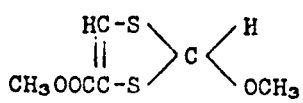 |
| 157 | 1491 | CF₃C≡C-S⁺ |
| 143 | 1119 | CF₃-C‖CF₂-C⁺ |
| 125 | 1029 | CF₃C≡CS⁺ |
| 69 | 2244 | CF₃⁺ |

EXAMPLE 2

4,5-Bis(trifluoromethyl)-2-ethoxy-1,3-dithiole
(Formula 4; $R^1=R^2=CF_3$; $X=OC_2H_5$)

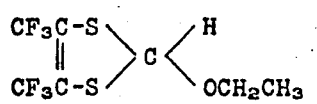

A mixture of 15 ml. of ethanol, 15 ml. of carbon disulfide, and 16 g. of hexafluoro-2-butyne was heated at 100° for 3 days. The reaction mixture was distilled. 4,5-Bis(trifluoromethyl)-2-ethoxy-1,3-dithiole was collected at 70°-73° and 10 torr, 17.1 g., $n_D^{25}$ 1.4264.

Anal. Calcd. for $C_7H_6F_6OS_2$: C, 29.57; H, 2.12; S, 22.56; F, 40.11 Found: C, 19.51; H, 2.08; S, 22.54; F, 41.13

$H^1$ nmr: Methine (>CH—) [1] singlet at $\delta 6.42$, methylene (—CH₂—) quartet [2] centered at $\delta 3.38$, and methyl triplet [3] centered at $\delta 1.03$.

IR: Double bond at 1590 cm.$^{-1}$ and strong, broad C-F absorption.

EXAMPLE 3

4-Carbomethoxy-2-methoxy-1,3-dithiole (Formula 4; $R^1=COOCH_3$; $R^2=H$; $X=OCH_3$)

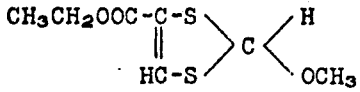

A mixture of 9 g. of methyl propiolate, 15 ml. of carbon disulfide, and 15 ml. of methanol was heated at 100° for 4 days. Distillation gave 2.7 g. of 4-carbomethoxy-2-methoxy-1,3-dithiole, b.p. 99° at 0.9 torr, $n_D^{25}$ 1.5696.

Anal. Calcd. for $C_6H_8O_3S_2$: C, 37.48; H, 4.20; S, 33.36 Found: C, 37.65; H, 4.20; S, 33.28

$H^1$ nmr: Methine resonance at $\delta 7.32$ [1] and 6.89 [1] and methoxyl resonance at $\delta 3.67$ [3] and 3.07 [3].

IR: 3000(m), 1710 (s), 1550 (s), 1440 (s), 1340 (w), 1280 (s), 1250 (s), 1210 (m), 1190 (m), 1050 (s), 950 (m), 900 (s), 850 (m), 830 (m), 770 (s), 750 (s), 730 (s).

UV: In ethanol, $\lambda 304$ ($\epsilon 6600$) and sh 230 nm ($\epsilon 4050$).

EXAMPLE 4

4-Carbethoxy-2-methoxy-1,3-dithiole (Formula 4; $R^1=COOC_2H_5$; $R^2=H$; $X=OCH_3$)

$$CH_3CH_2OOC-C-S\underset{HC-S}{\overset{\|}{\diagdown}}C\diagdown_{OCH_3}^{H}$$

A mixture of 20 g. of ethyl propiolate, 20 ml. of carbon disulfide, and 20 ml. of methanol was heated at 100° for 4 days. Unchanged starting materials were removed under reduced pressure. The residue was distilled through a micro column to give 3.0 g. of 4-carbethoxy-2-methoxy-1,3-dithiole, b.p. 92°-95° at 0.5 torr, $n_D^{25}$ 1.5656.

Anal. Calcd. for $C_7H_{10}O_3S_2$: C, 40.75; H, 4,89; S, 31.09 Found: C, 40.86; H, 5.05; S, 31.03

$H^1$ nmr: Methyl triplet centered at $\delta 1.23$ [3], methoxyl singled at $\delta 3.12$ [3], methylene quartet centered at $\delta 4.18$ [2], and methine singlets at $\delta 6.98$ [1] and 7.40 [1].

IR: 3000 (m), 1700 (s), 1550 (s), 1450 (m), 1390 (w), 1360 (m), 1280 (s), 1250 (m), 1200 (m), 1180 (m), 1090 (m), 1050 (s), 1000 (m), 920 (m), 900 (s), 880 (m), 840 (m).
UV: In ethanol, λ 304 (ε6080) and *sh* 230 nm (ε4260).

EXAMPLE 5

4,5-Bis(Carbomethoxy)-2-methoxy-1,3-dithiole
(Formula 4; $R^1=R^2=COOCH_3$; $X=OCH_3$)

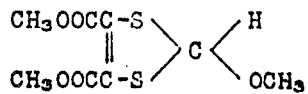

A mixture of 15 ml. of carbon disulfide, 15 ml. of methanol, and 14.2 g. of dimethyl acetylenedicarboxylate was heated at 100° for 3 days. The addition of ether to the contents of the tube precipitated 6.3 g. (25%) of crude 4,5-bis(carbomethoxy)-2-methoxy-1,3-dithiole, m.p. 39°–44°. Recrystallization from methanol raised the melting point to 60.5°–61.5°.

Anal. Calcd. for $C_6H_{10}O_5S_2$: C, 38.38; H, 4.03; S, 25.62
  Found: C, 38.42; H, 4.18; S, 25.53
$H^1$ nmr: Methoxyl singlet at δ3.30 [3], methoxycarbonyl singlet at δ3.82 [6], and methine singlet at δ6.83 [1].
UV: In ethanol, λ 314 (ε5120), 238 (ε3780), and 218 nm (ε3190).

When the reaction was run at 130° for 8 hours, a 60 percent yield was obtained.

EXAMPLE 6

4,5-Bis(trifluoromethyl)-2-(4-hydroxyphenyl)-1,3-dithiole (Formula 4; $R^1=R^2=CF_3$; X=4-hydroxyphenyl)

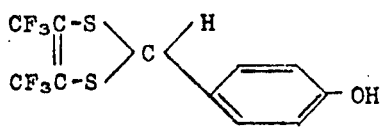

A mixture of 20 g. of phenol, 20 ml. of carbon disulfide, and 16 g. of hexafluoro-2-butyne was heated at 100° for 3 days. The reaction mixture was distilled through a short still head to give 17.7 g. of 4,5-Bis(trifluoromethyl)-2-(4-hydroxyphenyl)-1,3-dithiole, b.p. 125°–136° at 0.5 torr, m.p. 51°–56°. Recrystallization from hexane raised the melting point to 68°–69.5°.

Anal. Calcd. for $C_{11}H_6F_6OS_2$: C, 39.75; H, 1.82; S, 19.30; F, 34.31 Found: C, 39.98; H, 1.88; S, 19.83; F, 34.64
$F^{19}$ nmr: Singlet at +3163 c.p.s. from trichlorofluoromethane.
$H^1$ nmr: A singlet at δ6.22 [1] and an aromatic multiplet [5] which included the hydroxyl hydrogen.

IR: 3330 (m), 1605 (s), 1515 (m), 1500 (m), 1460 (m), 1330 (m), 1270 (s), 1180 (s), 1140 (s), 1090 (m), 1040 (m), 920 (s).
UV: In isooctane, λ 325 (ε2590) and 282 nm (ε3980).

EXAMPLE 7

Dimethyl 2-(2,5-dichloro-4-hydroxyphenyl)-1,3-dithiole-4,5-dicarboxylate (Formula 4; $R^1=R^2=COOCH_3$; X=2,5-dichloro-4-hydroxyphenyl)

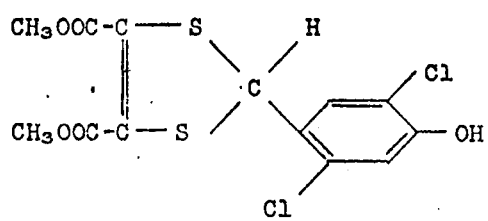

A mixture of 36 g. of dimethyl acetylenedicarboxylate, 50 g. of 2,5-dichlorophenol, and 100 ml. of carbon disulfide was heated at 130° for 8 hours. Filtration of the reaction product gave 24.3 g. of crude dimethyl 2-(2,5-dichloro-4-hydroxyphenyl)-1,3-dithiole-4,5-dicarboxylate which melted at 134°–136°. Recrystallization from ethanol raised the melting point to 177°–178°.

Anal. Calcd. for $C_{13}H_{10}Cl_2O_5S_2$: C, 40.92; H, 2.65; Cl, 18.60; S, 16.82 Found: C, 41.28; H, 2.88; Cl, 18.39; S, 16.89
$H^1$ nmr (in hexadeuterioacetone): Methyl [6] singlet at δ3.23, dithiole hydrogen singlet [1] at δ5.80, and aromatic hydrogen singlets at 6.60 [1] and δ7.24 [1]. There was a broad resonance at δ2.55 [1] for the hydroxyl hydrogen. This moved to lower field upon addition of $D_2O$. The absence of coupling between the two aromatic hydrogens indicates that they are para to each other.

IR: 3300 (m), 2970 (w), 1740 (s), 1700 (s), 1600 (m), 1580 (s), 1480 (m), 1450 (m), 1400 (m), 1310 (s), 1270 (s), 1220 (s), 1100 (m), 1080 (s), 1025 (m), 970 (m), 950 (w), 910 (w), 885 (w), 875 (w), 860 (m), 830 (w), 785 (m), 770 (w), 760 (m), 750 (w), 730 (w), 700 (m), 690 (m).
UV: In ethanol, $\lambda_{max}$ 350 (ε4080) and 286 nm (ε6400).

EXAMPLE 8

2-Benzoyl-4,5-bis(trifluoromethyl)-1,3-dithiole and 2-benzoyl-4,4', 5,5'-tetrakis(trifluoromethyl)-2,2'-di-(1,3-dithiole) (Formula 4; $R^1=R^2=CF^3$; $X=C_6H_5CO$ or

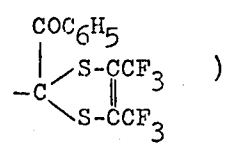

)

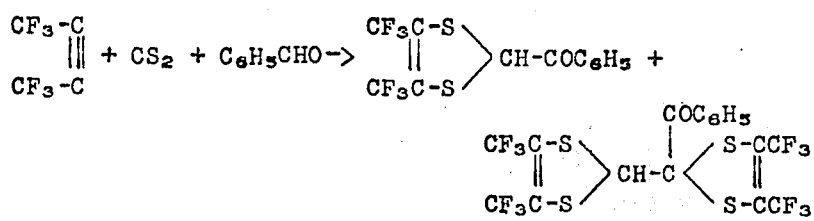

A mixture of 20 ml. of carbon disulfide, 15 g. of benzaldehyde, and 16.5 g. of hexafluoro-2-butyne was heated at 100° for 6 days. The volatiles were removed under reduced pressure, leaving an oily residue. Some solid was obtained by adding hexane. Filtration gave 1.8 g. of pale yellow solid, m.p. 82°–86°. Recrystallization of part of this solid from hexane gave 2-benzoyl-4,5-bis(trifluoromethyl)-1,3-dithiole, m.p. 87°–88°.

Anal. Calcd. for $C_{12}H_6F_6OS_2$: C, 41.86; H, 1.78; S, 18.62; F, 33.11 Found: C, 41.28; H, 1.75; S, 19.17; F, 34.39

$F^{19}$ nmr showed one peak at +3173 c.p.s. from trichlorofluoromethane. $H^1$ nmr showed an aromatic multiplet [5] and a singlet [1] at $\delta 6.19$.

IR: 1690 (s), 1610 (s), 1590 (m), 1450 (m), 1270 (s), 1160 (s), 1080 (m), 1000 (m), 990 (m), 925 (m), 850 (m), 820 (m), 780 (m), 735 (m), 720 (m), 700 (m), 685 (m), 660 (m).

UV: In isooctane, $\lambda$ sh 357 ($\epsilon$743), sh 310 ($\epsilon$2000), 249 nm ($\epsilon$12,800).

Part of the filtrate residue from above was chromatographed on a commercial analytical adsorbent (Florisil). Elution with hexane yielded crystalline 2-benzoyl-4,4', 5,5'-tetrakis(trifluoromethyl)-2,2'-di-(1,3-dithiole), m.p. 43°–45°.

Anal. Calcd. for $C_{17}H_6F_{12}OS_4$: C, 35.05; H, 1.04; S, 22.02; F, 39.14; MW, 582.50 Found: C, 35.20; H, 1.17; S, 22.01; F, 40.32; MW, (mass spec, m/e 582)

$F^{19}$ nmr showed two peaks of equal intensity at +3161 and +3189 c.p.s. from trichlorofluoromethane. $H^1$ nmr showed an aromatic multiplet [5] and a single at $\delta 5.52$.

IR (cm.$^{-1}$): 1660 (s), 1610 (s), 1580 (m), 1450 (m), 1270 (s), 1170 (s), 1040 (w), 1020 (w), 1000 (w), 975 (w), 920 (s), 875 (w), 840 (m), 835 (w), 775 (m), 760 (m), 720 (s), 695 (s), 685 (s), 660 (w).

UV: In isooctane, sh 380 ($\epsilon$245) sh 325 ($\epsilon$2690), 267 nm ($\epsilon$13,400).

Mass spec. The most abundant ions were at m/e 343 and 239, suggesting predominant cleavage of the central carbon-carbon bond giving the stable dithiolium ions.

Analysis of the crude reaction mixture by nmr (the lines at $\delta 6.19$ and $\delta 5.52$) indicated that the two compounds were formed in a 30:70 ratio, respectively.

EXAMPLE 9

2-cinnamoyl-4,4',5,5'-tetrakis(trifluoromethyl)-2,2'-bi-(1,3-dithiole) (Formula 4; $R^1=R^2=CF_3$;

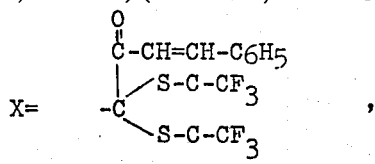

,

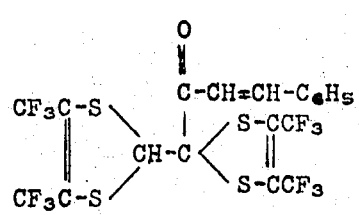

A mixture containing 16.5 g. of hexafluoro-2-butyne, 24 g. of carbon disulfide, and 15 g. of cinnamaldehyde was heated at 100° for 3.5 days. The reaction product was concentrated under reduced pressure to remove excess carbon disulfide. Methanol was added to the residue, and it was cooled to −70° to cause crystallization. Filtration gave 10.2 g. of 2-cinnamoyl-4,4'-5,5'-tetrakis(trifluoromethyl)-2,2'-di-(1,3-dithiole), which melted at 78°–79°. Recrystallization from hexane raised the melting point to 88°.

Anal. Calcd. for $C_{19}H_8F_{12}OS_4$: C, 37.50; H, 1.32; S, 21.08; F, 37.47 Found: C, 37.44; H, 1.49; S, 21.20; F, 37.51

$F^{19}$ nmr showed two singlets of equal intensity at +3166 and +3187 c.p.s. from internal trichlorofluoromethane.

The product

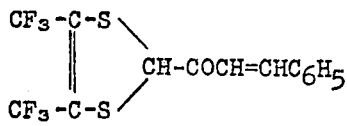

was also formed.

EXAMPLE 10

α-Methyl-4,5-bis(trifluoromethyl)-1,3-dithiole-2-acetaldehyde (Formula 4; $R^1=R^2=CF^3$;

$$X= -\overset{CH_3}{\underset{|}{CH}}-CHO\ )$$

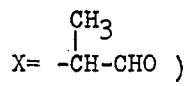 + $CS_2$ + $CH_3CH_2CHO$

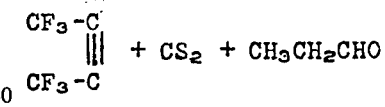

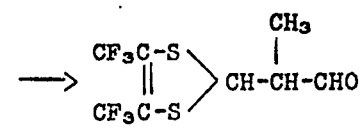

A mixture of 15 g. of propionaldehyde, 15 ml. of carbon disulfide, and 16.5 g. of hexafluoro-2-butyne was heated at 100° for 4 days. The reaction mixture was distilled under reduced pressure to give 8.1 g. of α-methyl-4,5-bis(trifluoromethyl)-1,3-dithiole-2-acetaldehyde as a pale-yellow liquid, b.p. 54°–55° at 0.25 torr, $n_D^{25}$ 1.4428.

Anal. Calcd. for $C_8H_6F_6OS_2$; C, 32.43; H, 2.04; S, 21.65; F, 38.48 Found: C, 32.34; H, 2.04; S, 21.61; F, 40.33

$H^1$ nmr: Formyl (—CHO) hydrogen [1] as a broadened "singlet" at $\delta 9.40$, dithiole hycrogen [1] as a doublet (J = 6 c.p.s.) at $\delta 5.03$, hydrogen multiplet [1], at $\delta 2.81$ and a methyl [3] doublet (J = 7 c.p.s.) at $\delta 1.24$.

IR: Strong absoprtion at 1720 (carbonyl), 1620 (C—C double bond) and 1200 cm.$^{-1}$ (CF).

EXAMPLE 11

2-Acetonyl-4,5-bis(trifluoromethyl)-1,3-dithiole
(Formula 4; $R^1=R^2=CF_3$; $X=CH_2COCH_3$)

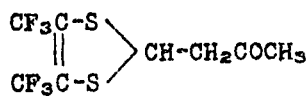

A mixture of 15 ml. of acetone, 15 ml. of carbon disulfide, and 17.3 g. of hexafluoro-2-butyne was heated at 100° for 4 days. Distillation of the reaction mixture through a small column gave 5.6 g. of 2-acetonyl-4,5-bis(trifluoromethyl)-1,3-dithiole, b.p. 64°–65° at 2.5 torr, $n_D^{25}$ 1.4441.

Anal. Calcd. for $C_8H_6F_6OS_2$: C, 32.43; H, 2.04; S, 21.65; F, 38.48 Found: C, 32.67; H, 2.08; S, 21.51; F, 40.28

$H^1$ nmr: Methyl singlet [3] at δ1.93, methylene doublet [2] centered at δ3.03 (J = 7 c.p.s.), and methine triplet [1] centered at δ4.90.

EXAMPLE 12

α,α-Dimethyl-4,5-bis(trifluoromethyl)-1,3-dithiole-2-acetaldehyde (Formula 4; $R^1=R^2=CF_3$;

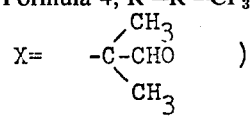

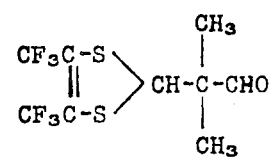

A mixture of 15 ml. of carbon disulfide, 15 ml. of isobutyraldehyde, and 16.5 g. of hexafluoro-2-butyne was heated at 100° for 3 days. The reaction mixture was distilled through a short still head to give 9.0 g. of product, b.p. 45°–50° at 0.6 torr, $n_D^{25}$ 1.4400.

Anal. Calcd. for $C_9H_8F_6OS_2$: C, 34.84; H, 2.60; S, 20.67; F, 36.74 Found: C, 35.07; H, 2.57; S, 19.85; F, 38.32

$H^1$ nmr: Methyl singlet [6] at δ1.17, methine singlet [1] at δ5.08, and formyl hydrogen singlet [1] at δ9.37.

EXAMPLE 13

2-(1-Methyl-2-oxopropyl)-4,5-bis(trifluoromethyl)-1,3-dithiole (Formula 4; $R^1=R^2=CF_3$;

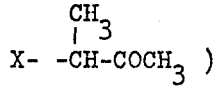

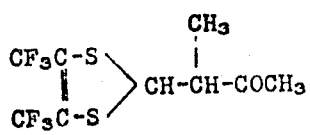

A mixture of 15 ml. of carbon disulfide, 15 ml. of methyl ethyl ketone, and 16.5 g. of hexafluoro-2-butyne was heated at 100° for 4 days. Distillation of the reaction mixture gave 9.2 g. of 2-(1-methyl-2-oxopropyl)-4,5-bis(trifluoromethyl)-1,3-dithiole, b.p. 52°–56° at 0.15 torr, $n_D^{25}$ 1.4443.

Anal. Calcd. for $C_9H_8F_6OS_2$: C, 34.84; H, 2.60; S, 20.67; F, 36.74 Found: C, 34,92; H, 2.51; S, 20.76; F, 38.80

$H^1$ nmr: Methyl doublet [3] centered at δ1.14 (J = 7 c.p.s.), methyl singlet [3] at δ1.95, methine multiplet [1] centered at δ2.91, and a methine doublet [1] centered at δ4.90 (J = 8 c.p.s.).

EXAMPLE 14

2-(Diacetylmethyl)-4,5-bis(trifluoromethyl)-1,3-dithiole [Formula 4; $R^1=R^2=CF_3$; $X=CH(COCH_3)_2$]

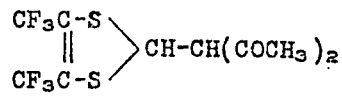

A sealed tube containing 15 ml. of carbon disulfide, 15 g. of 2,4-pentanedione, and 16 g. of hexafluoro-2-butyne was heated at 100° for 4 days. From the reaction mixture there was obtained 18.0 g. of 2-(diacetylmethyl)-4,5-bis(trifluoromethyl)-1,3-dithiole, m.p. 68°–69°. Recrystallization from hexane raised the melting point to 70°–71°.

Anal. Calcd. for $C_{10}H_8F_6O_2S_2$: C, 35.50; H, 2.39; S, 18.95; F, 33.70 Found: C, 35.71; H, 2.33; S, 19.31; F, 34.11

$H^1$ nmr; Methyl singlet [6] at δ2.33, and the methine hydrogens as an AB pattern [2] (J = 11 c.p.s.) around δ5.

IR: Carbonyl at 1700 and double bond at 1600 cm.$^{-1}$.

EXAMPLE 15

2-Benzoylmethyl-4,5-bis(trifluoromethyl)-1,3-dithiole
(Formula 4; $R^1=R^2=CF_3$; $X=CH_2COC_6H_5$)

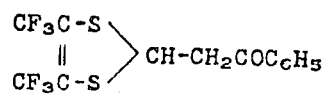

A sealed tube containing 12 g. of acetophenone, 15 ml. of carbon disulfide, and 16.7 g. of hexafluoro-2-butyne was heated at 100° for 6 days. Filtration of the reaction mixture gave 28.3 g of 2-benzoylmethyl-4,5-bis(trifluoromethyl)-1,3-dithiole, m.p. 85°–87°. Recrystallization from hexane raised the melting point to 87°–88°.

Anal. Calcd. for $C_{13}H_8F_6OS_2$: C, 43.57; H, 2.25; S, 17.89; F, 31.81 Found: C, 43.91; H, 2.40; S, 18.01; F, 32.70

$H^1$ nmr: Methylene doublet [2] centered at δ3.65, methine triplet [1] centered at δ5.20, and aromatic multiplet [5].

IR: Carbonyl absorption at 1700 cm.$^{-1}$.

EXAMPLE 16

2-(2-Oxocyclohexyl)-4,5-bis(trifluoromethyl)-1,3-dithiole (Formula 4; $R^1=R^2=CF_3$;

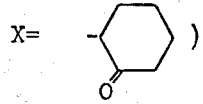

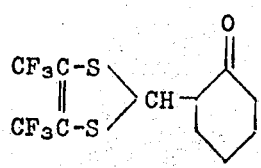

A mixture of 15 ml. of cyclohexanone, 15 ml. of carbon disulfide, and 17.2 g. of hexafluoro-2-butyne was heated at 100° for 5 days. The product was distilled through a short still head to give 25.2 g. of 2-(2-oxocyclohexyl)-4,5-bis(trifluoromethyl)-1,3-dithiole, b.p. 108° at 1.5 torr, $n_D^{25}$ 1.4739.

Anal. Calcd. for $C_{11}H_{10}F_6OS_2$: C, 39.28; H, 3.00; S, 19.07; F, 33.90 Found: C, 39.43; H, 3.22; S, 18.76; F, 34.40

$H^1$ nmr: Broad absorption at $\delta 1.0$–3.0 [9] and a doublet centered at $\delta 5.12$ [1] with J = 6 c.p.s.

EXAMPLE 17

Methyl-2-diacetylmethyl-1,3-dithiole-4-carboxylate [Formula 4; $R^1$=CH$_3$COO; $R^2$=H; X=CH(COCH$_3$)$_2$]

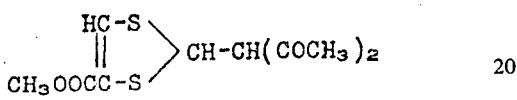

A mixture of 21 g. of methyl propiolate, 120 g. of carbon disulfide, and 40 g. of 2,4-pentanedione was heated at 150° for 6 hours. The mixture was concentrated under reduced pressue to remove unchanged starting materials. The nonvolatile residue was dissolved in methanol and cooled to −78° to cause crystallization. Filtration gave 11.3 g. of crystalline methyl-2-diacetylmethyl-1,3-dithiole-4-carboxylate which melted at 113°–115°. Recrystallization from methanol raised the melting point to 119°–120°.

Anal. Calcd. for $C_{10}H_{12}O_4S_2$: C, 46.13; H, 4.64; S, 24.64 Found: C, 46.26; H, 4.60; S, 25.07

$H^1$ nmr: Acetylmethyl [6] singlet at $\delta 2.28$, methoxyl [3] singlet at $\delta 3.78$, the methine hydrogens [2] as an AB pattern (J = 11 c.p.s.) with chemical shifts at $\delta 4.60$ and 5.48, and a dithiole hydrogen [1] singlet at $\delta 7.12$.

EXAMPLE 18

2-[1-(2-Methoxy-1-trifluoromethylcyclopropyl)trifluoroethylidene]-4,5-bis(trifluoromethyl)-1,3-dithiole (Formula 5; $R^1$=CF$_3$; Y and Z together are

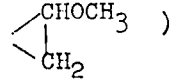

)

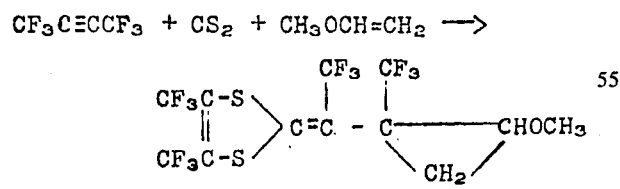

A mixture containing 18 g. of hexafluoro-2-butyne, 25.2 g. of carbon disulfide, and 19 g. of methyl vinyl ether was heated at 100° for 3.5 days. The product was distilled under reduced pressure through a spinning-band column. 2-[1-(2-Methoxy-1-trifluoromethylcyclopropyl)trifluoroethylidene]4,5-bis(trifluoromethyl)- 1,3-dithiole was collected at 85°–88° and 3.0 torr in a yield of 17.6 g. The center cut, b.p. 87.5° at 3.0 torr, $n_D^{25}$ 1.4291 (6.74 g.), was analyzed.

Anal. Calcd. for $C_{12}H_6F_{12}OS_2$: C, 31.5; H, 1.32; F, 49.8; S, 14.0 Found: C, 32.0; H, 1.58; F, 49.9; S, 14.4

The $H^1$ nmr spectrum clearly showed the presence of two stereoisomers, corresponding to the 1,2-disubstituted cyclopropyl group. The cyclopropylmethylene resonance was a series of eight peaks [2] at the relatively high field position of $\delta 1.0$ to 1.6. The methoxyl resonance was two peaks [3] at $\delta 6.6$. The methine hydrogen (intensity 1) resonance occurred as four peaks, each split into a doublet atound $\delta 3.85$.

The near-infrared specturm clearly showed the absorption at 6060 cm.$^{-1}$ characteristic of the cyclopropylmethylene group.

EXAMPLE 19

2-[1-(2-Ethoxy-1-trifluoromethylcyclopropyl)trifluoroethylidene]-4,5-bis(trifluoromethyl)-1,3-dithiole (Formula 5; $R^1$=CF$_3$; Y and Z together form

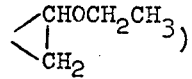

)

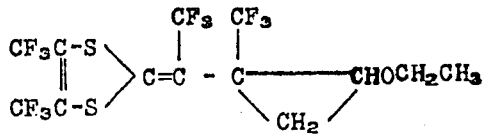

A mixture containing 16.5 g. of hexafluoro-2-butyne, 25.2 g. of carbon disulfide and 14 g. of ethyl vinyl ether was heated at 70° for 6 days. Volatile liquids were removed under reduced pressure. The residue was filtered to give 0.69 g. of white solid which melted at 52°–54°. The filtrate was distilled to give 7.12 g. of product which boiled at 52°–62° and 0.40 torr. The liquid (a mixture of stereoisomers of the dithiole shown above) and the solid (principally one isomer) had nearly identical infrared and nmr spectra. Recrystallization of the solid from hexane raised the melting point to 64°–65.5°. This recrystallized solid was analyzed.

Anal. Calcd. for $C_{13}H_8F_{12}OS_2$: C. 33.1; H, 1.71; F, 48.3; S, 13.6; MW, 472 Found: C, 33.6; H, 1.86; F, 47.4; S, 13.8; MW (mass spec), 472

The infrared spectrum showed carbon-carbon double-bond absorption at 1580 cm.$^{-1}$ as well as strong CF absorption. The $H^1$ and $F^{18}$ nmr spectra confirmed that the product was a mixture of two stereoisomers. An overlapping pair of —CH—CH$_2$— and OCH$_2$—CH$_3$ patterns was seen.

EXAMPLE 20

2-[1-(1-Trifluoromethylcyclopropyl)trifluoroethylidene]-4,5-bis(trifluoromethyl)-1,3-dithiole (Formula 5; $R^1$=CF$_3$; Y and Z together form

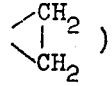

)

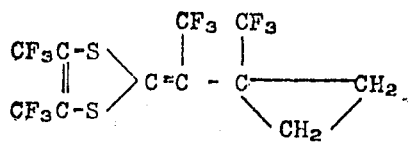

A mixture containing 17 g. of hexafluoro-2-butyne, 18 g. of carbon disulfide, and 8 g. of ethylene was heated at 100° for 5 days. It was distilled under reduced pressure. 2-[1-(1-trifluoromethylcyclopropyl)-trifluoroethylidene]-4,5-bis(trifluoromethyl)-1,3-dithiole, 0.89 g., distilled at 42° and 20 torr, $n_D^{25}$ 1.3925.

Anal. Calcd. for $C_{11}H_4F_{12}S_2$: C, 30.9; H, 0.94; F, 53.2; S, 15.0 Found: C, 32.4; H, 1.32; F, 51.4; S, 14.6

The $H^1$ nmr spectrum of the product showed one broadened absorption at δ3.1, corresponding to cyclopropyl hydrogens.

EXAMPLE 21

2-[2-Acetoxy-bis-1,2-(trifluoromethyl)ethylidene]-4,5-bis(trifluoromethyl)-1,3-dithiole (Formula 5; $R^1$=CF$_3$; Y=H; Z=CH$_3$COO)

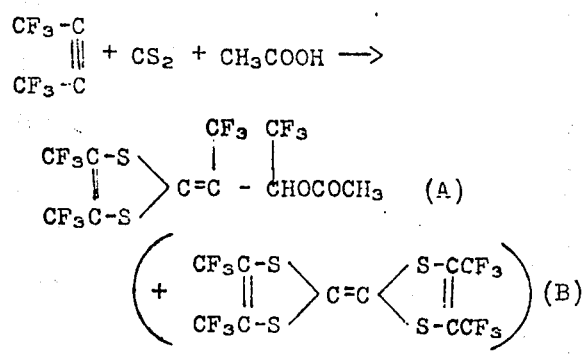

A mixture of 15 ml. of acetic acid, 15 ml. of carbon disulfide, and 17.6 g. of hexafluoro-2-butyne was heated at 100° for 3 days. After the tube was cooled and opened, a small amount of gas evolved as the contents warmed to room temperature. The tube contents were poured into 250 ml. water. A red liquid separated and was extracted into ether. The ether solution was rinsed with water, dried over magnesium sulfate, and aspirated. The residue partly crystallized and was filtered to give 3.8 g. (16%) of the orange bi-dithiole (B) (described in Example 23, below), m.p. 85°–89°. The filtrate was concentrated under reduced pressure and the residue was distilled to give 16.9 g. (73%) of 2-[2-acetoxybis-1,2-(trifluoromethyl)ethylidene]-4,5-bis-(trifluoromethyl)-1,3-dithiole, (A), b.p. 40°–48° at 0.3 torr, $n_D^{24}$ 1.4202.

Anal. Calcd. for $C_{11}H_4F_2O_2S_{12}$; C, 28.70; H, 0.88; F, 49.54; S, 13.93 Found: C, 28.76; H, 0.82; F, 49.43; S, 15.12

$H^1$ nmr; Methyl [3] at δ1.98 and a hydrogen [1] as a quartet (J ~ 7 c.p.s.) centered at δ5.73. $F^{19}$ nmr calibrated from trichlorofluoromethane showed three areas of resonance: A single peak at +3209 c.p.s. [6], a quartet centered at +3541 c.p.s. [3] and a six-line pattern centered at +4270 c.p.s. [3].

EXAMPLE 22

2-[2-Benzoyloxy-1,2-bis(trifluoromethyl)ethylidene]-4,5-bis(trifluoromethyl)-1,3-dithiole (Formula 5; $R^1$=CF$_3$; Y=H; Z=C$_6$H$_5$COO)

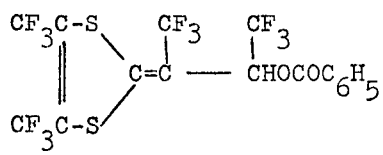

A mixture of 17 g. of hexafluoro-2-butyne, 25 ml. of carbon disulfide, 100 ml. of ethyl ether, and 15 g. of benzoic acid was heated at 130° for 8 hours. The pale red solution was dissolved in 300 ml. of ether. The solution was extracted with aqueous sodium carbonate solution to remove unchanged benzoic acid, dried over magnesium sulfate, filtered, and concentrated on a rotary evaporator. The residual oil crystallized upon standing overnight. Filtration gave 19.4 g. (73%) of 2-]2-benzoyloxy-1,2-bis-(trifluoromethyl)ethylidene]-4,5-bis(trifluoromethyl)-1,3-dithiole which melted at 53°–55°. Recrystallization from methanol raised the melting point to 62°–63°.

Anal. Calcd. for $C_{16}H_6F_{12}O_2S_2$: C, 36.79; H, 1.16; S, 12.28; F, 43.65 Found: C, 37.13; H, 1.25; S, 12.77; F, 43.65

$H^1$nmr: Aromatic multiplet [5] at δ7.3 to 8.2 and a CH quartet [1] centered at δ6.14 (J = 7 c.p.s.).

$R^{19}$ nmr: Three areas: A [6] a complex multiplet centered at +3156 c.p.s from trichlorofluoromethane; B [3] a quartet centered at +3478 c.p.s., J=10 c.p.s.; C [3] a quartet split into doublets centered at +4183 c.p.s., $J_1$ = 10 c.p.s., $J_2$ = 7 c.p.s.

IR: 1650 cm.$^{-1}$ (carbonyl), 1600 and 1540 cm.$^{-1}$ (C=C), and 1260 and 1180 cm.$^{-1}$ (CF).

EXAMPLE 23

4,4',5,5'-Tetrakis(trifluoromethyl)-Δ$^{2,2'}$-bi-(1,3-dithiole) (Formula 1; $R^1$=$R^2$—CF$_3$)

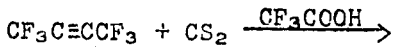

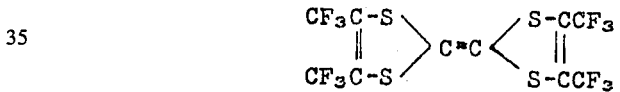

A mixture of 19 g. of carbon disulfide, 15.6 g. of hexafluoro-2-butyne and 23 g. of trifluoroacetic acid (pKa 0.23) was heated at 100° for 4 days. A little pentane was added, and the mixture was filtered to give 23.2 g. (100%) of the red-orange crystalline product, m.p. 88°–89°.

Annal. Calcd. for $C_{10}F_{12}S_4$: C, 25.2; F, 47.9; S, 26.9 MW, 476 Found: C, 25.5; F, 47.8; S, 27.2; MW (mass spec.), 476

Mass spec.: In addition to the parent peak there was an abundant peak at m/e 238 (half parent).

UV: In isooctane, $\lambda_{max}$ 412 (ϵ1520), 310 (ϵ13,600) and 222 m (ϵ12,600).

$F^{19}$ nmr: One single sharp peak at −578 c.p.s. from external 1,2 -difluorotetrachloroethane.

IR: Strong carbon-carbon double-bond absorption at 1610 cm.$^{-1}$.

Heating the reactants in the absence of the acid gave a low (2%) yield of the above product. In the presence of acetic acid (pK$_a$ 4.76; Example 21) the yield of the bi-dithiole was 16%. With formic acid (pK$_a$ 3.75) the yield was 50%.

EXAMPLE 24

Tetramethyl-Δ2,2'-bi-(1,3-dithiole)-4,4',5,5'-tetracarboxylate (Formula 1; $R^1$=$R^2$=CH$_3$COO)

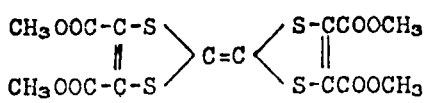

A mixture of 14.2 g. of dimethyl acetylenedicarboxylate, 25.2 g. of carbon disulfide, and 22 g. of acetic acid was heated at 100° for four days. The mixture was filtered to give 2.1 g. of the bi-dithiole, m.p. 165°–168°. Recrystallization from benzene-hexane raised the melting point to 169°–170°.

Anal. Calcd. for $C_{14}H_{12}O_8S_4$: C, 38.5; H, 2.77; S, 29.4
Found: C, 38.8; H, 2.83; S, 29.3

The $H^1$ nmr spectrum of the product showed only one peak, at $\delta 3.85$. The infrared spectrum showed carbonyl absorption at 1710 and 1740 cm.$^{-1}$ and carbon-carbon double bond absorption at 1570 cm.$^{-1}$. The ultraviolet spectrum (ethanol) showed absorption at 445 ($\epsilon 1930$), 315 ($\epsilon 13,100$), 284 ($\epsilon 14,300$), and 245 nm ($\epsilon 15,500$).

EXAMPLE 25

Diethyl $\Delta^{2,2'}$-bi-(1,3-dithiole)-4,4'-dicarboxylate (A); diethyl $\Delta^{2,2'}$-di-(1,3-dithiole)-4,5'-dicarboxylate (B)

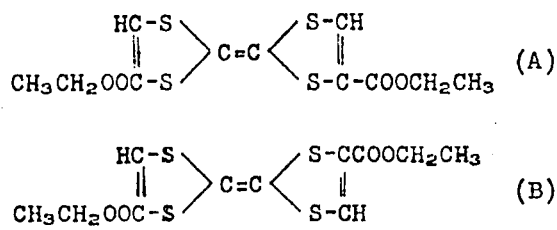

Ether was added to the distillation residue of Example 4, and filtration gave 0.31 g. of the bi-dithiole, which is either one of the two geometric isomers (A) and (B), possibly contaminated with the other isomer. The product melted at 130°–144°. Recrystallization from methanol raised the melting point to 169°–172°.

Anal. Calcd. for $C_{12}H_{12}O_4S_4$: C, 41.3; H, 3.47; S, 36.8
Found: C, 41.3; H, 3.43; S, 37.1

The $H^1$ nmr spectrum showed a methyl triplet [3] centered at $\delta 1.35$, a methylene quartet [2] centered at $\delta 4.31$, a methine singlet [1] at $\delta 7.40$.

EXAMPLE 26 s-Tetrathianediylidenedi-[bis(trifluoromethyl)ethanediylidene]-2,2'-bis[4,5-bis(trifluoromethyl)-1,3-dithiole] (Formula 2; $R^1=R^2=CF_3$)

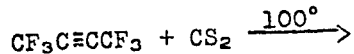

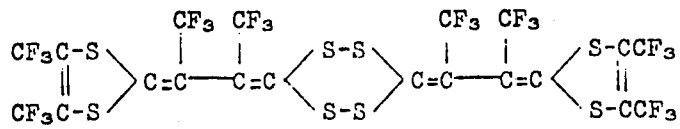

A mixture containing 16 g. of hexafluoro-2-butyne and 25.2 g. of carbon disulfide was heated at 100° for 2.5 days. Addition of hexane (60 g.) precipitated a solid. Filtration gave 4.3 g. (20%) of crude s-tetrathianediylidenedi-[bis(trifluoromethyl)ethanediylidene]-2,2'-bis[4,5-bis(trifluoromethyl)-1,3-dithiole] which melted at 165°–177°. Recrystallization from acetone gave white crystals of the product which melted at 195° when immersed in a preheated bath.

Anal. Calcd. for $C_{20}F_{24}S_8$: C, 25.2; F, 47.9; S, 26.9; MW, 932 Found: C, 25.1; F, 48.0; S, 28.0; MW, 921 (ebullioscopic in acetone)

IR: Carbon-carbon double-bond absorption at 1575 cm.$^{-1}$. Strong CF absorption at 1150 and 1250 cm.$^{-1}$.

UV: $\lambda_{max}$ 288 nm ($\epsilon 16,500$) in isooctane.

The hexane filtrate from above was concentrated and the residue was refiltered to give 8.15 g of amorphous solid. The ether-insoluble and hexane-soluble parts were separated from the bulk of the solid (7.05 g. mp 105°–112°C), which was soluble in ether or hexane but insoluble in methanol. A small amount of this material was sublimed, and the sublimate melted at 119°–121°C. The infrared spectrum of the sublimate was identical to that of (1,1,1,4,4,4-hexafluoro-2,3-butadiylidene)-2,2'-bis[4,5-(trifluoromethyl)-1,3-dithiole], described by Krespan and England, J. Org. Chem. 33, 1853–1854 (1968).

When a mixture of 16.8 g. of the hexafluoro-2-butyne and 50.4 g. of carbon disulfide was similarly heated, a yield of 12.8 g. (60%) of the product of Formula 2 ($R^1=R^2=CF_3$) was obtained.

EXAMPLE 27

Tetramethyl s-tetrathianediylidenedi[bis(methoxycarbonyl)ethanediylidene]-2,2'-bis(1,3-dithiole-4,5-dicarboxylate) (Formula 2; $R^1=R^2=COOCH_3$)

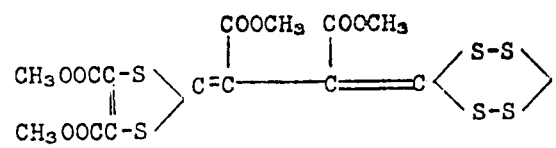

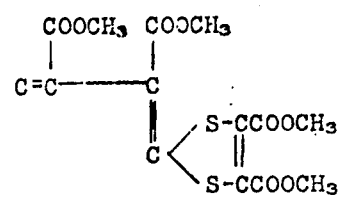

A mixture of 14.2 g. of dimethyl acetylenedicarboxylate and 50.4 g. of carbon disulfide was heated at 100° for 18 hours. The mixture was filtered to give 1.11 g. of solid tetramethyl s-tetrathianediylidenedi[bis-methoxycarbonyl)ethanediylidene]-2,2'-bis(1,3-dithiole-4,5-dicarboxylate) which melted at 237°–239° with decomposition. Recrystallization from diethylene glycol dimethyl ether raised the melting point to 247°–250° with decomposition.

Anal. Calcd. for $C_{28}H_{24}O_{16}S_8$: C, 38.5; H, 2.77; S, 29.4
Found: C, 38.9; H, 3.04; S, 29.1
IR: Carbonyl absorption at 1750, 1740, and 1720 cm.$^{-1}$. Carbon-carbon double-bond absorption at 1550 cm.$^{-1}$.

EXAMPLE 28

Tetramethyl bis(methoxycarbonyl)ethanediylidene-2,2'-bis-(1,3-dithiole-4,5-dicarboxylate) (Formula 3; $R^1=R^2=COOCH_3$)

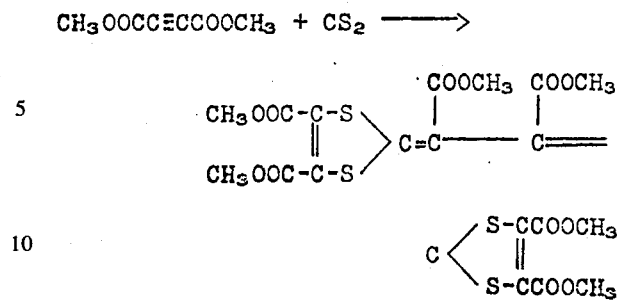

The filtrate after the separation of the product in Example 27 was a dark oil. It was triturated with ethanol, and the mixture was filtered to give 0.92 g. of yellow tetramethyl bis(methoxycarbonyl)ethane-diylidene-2,2'-bis(1,3-dithiole-4,5-dicarboxylate) which melted at 200°. Two recrystallizations from ethanol raised the melting point to 212.5°–213.5°.

Anal. Calcd. for $C_{20}H_{18}O_{12}S_4$: C, 41.5; H, 3.14; S, 22.2; MW, 578 Found: C, 41.6; H, 3,3; S, 22,3; MW, 578 (mass spec)

Mass Spectrum

| m/e | Intensity | Assignment |
|---|---|---|
| 578 | 6539 | Parent |
| 547 | 471 | P - OCH$_3$ |
| 519 | 383 | P - COOCH$_3$ |
| 460 | 399 | P - 2 COOCH$_3$ |
| 372 | 28.5 | P - $\begin{array}{c}CH_3OOC-C-S\\ \parallel \\ CH_3OOC-C-S\end{array}$ |
| 360 | 20.1 | P - $\begin{array}{c}CH_3OOC-C-S\\ \parallel \qquad\qquad >C\\ CH_3OOC-C-S\end{array}$ |
| 289 | 531.1 | 1/2P, i.e., $\begin{array}{c}CH_3OOC-C-S\qquad COOCH_3\\ \parallel \qquad\qquad >C=C-\\ CH_3OOC-C-S\end{array}$ |

The H¹ nmr spectrum showed three unsplit methoxyl groups of equal intensity at δ3.92, 3.87, and 3.75. The infrared spectrum showed carbonyl absorptions at 1740 and 1720 cm.⁻1, and strong absorption at 1580 cm⁻1 of the carbon-carbon double bond.

The usefulness of the novel compounds of this invention was demonstrated in the following manner: Solutions of five compounds in acetone were prepared as shown in the following table.

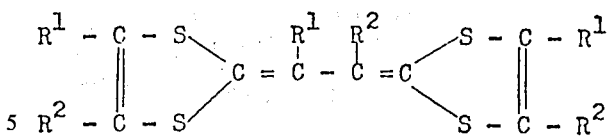

(3)

| Solution | Compound, g (Example) | Acetone (ml) |
|---|---|---|
| 1 | CF₃-C-S\\C=C/S-C-CF₃ / CF₃-C-S/ \\S-C-CF₃ , 0.27 (23) | 10 |
| 2 | CF₃-C-S\\C=C - C=C/S-S\\C=C - C=C/S-C-CF₃ / CF₃-C-S/ \\S-S/ \\S-C-CF₃ , 20 |   |
|   | 0.22 (26) |   |
| 3 | CF₃-C-S\\C=C - C=C/S-C-CF₃ / CF₃-C-S/ \\S-C-CF₃ , 0.08 (26) | 5 |
| 4. | CF₃-C-S\\CH-CH₂COC₆H₅ , 0.12 (15) / CF₃-C-S/ | 5 |
| 5 | CF₃-C-S\\C=C - C - CH-OCH₃ / CF₃-C-S/ \\CH₂/ , 0.7 (18) | 5 |

Each solution was tested by dipping a cloth into it and then rubbing a tarnished silverware fork with the wetted area. In each test the wetted cloth removed the tarnish and improved the appearance of the silver. In a similar test with a cloth wetted only with acetone, the tarnished silver remained unchanged in appearance.

The embodiments of the invention in which an exclusive property or privilege is claimed are defined as follows:

1. A process for the preparation of a mixture of compounds having the following formulas (1), (2) and (3):

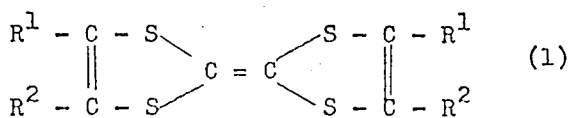

(1)

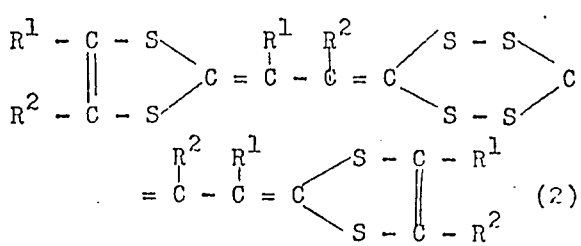

(2)

in which
R¹ is a member of the group alkoxycarbonyl of up to 12 carbon atoms, aryloxycarbonyl of up to 13 carbon atoms, lower perfluoroalkyl, arylcarbonyl of up to 13 carbon atoms, or the cyano group; and
R² is either the same as R¹ or hydrogen, C₁-C₅ alkyl, aryl of up to 12 carbon atoms, or aralkyl of up to 12 carbon atoms;
said process comprising the step of heating a mixture consisting essentially of an acetylenic compound having the formula R¹C ≡ CR², in which R¹ and R² have the above-identified meaning, with carbon disulfide within the temperature range of about 30°–200°C and at antogenous pressure.

2. A process of claim 1, leading predominantly to the product of formula (3), wherein the starting molar ratio of carbon disulfide to the acetylenic compound is at least about 5:1.

3. A process of claim 1, leading predominantly to the compound of formula(2), wherein the starting molar ratio of carbon disulfide to the acetylenic compound is less than about 5:1.

4. A process of claim 1, wherein the temperature is maintained within the range of about 90°–150°C.

5. A compound having the following formula

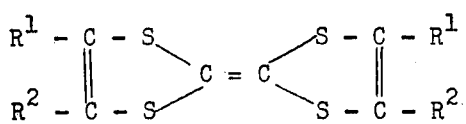

in which
R¹ is a member of the group alkoxycarbonyl of up to 12 carbon atoms, aryloxycarbonyl of up to 13 carbon atoms, lower perfluoroalkyl, arylcarbonyl of up to 13 carbon atoms, or the cyano group; and
R² is either the same as R¹ or hydrogen, a $C_1$–$C_5$ alkyl, aryl of up to 12 carbon atoms, or alkaryl of up to 12 carbon atoms.

6. A compound having the following formula

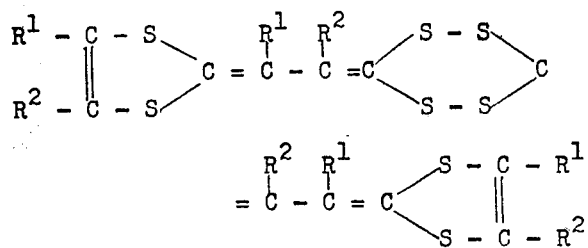

in which
R¹ is a member of the group alkoxycarbonyl of up to 12 carbon atoms, aryloxycarbonyl of up to 13 carbon atoms, lower perfluoroalkyl, arylcarbonyl of up to 13 carbon atoms, or the cyano group; and
R² is either the same as R¹ or hydrogen, a $C_1$–$C_5$ alkyl, aryl of up to 12 carbon atoms, or alkaryl of up to 12 carbon atoms.

7. A compound having the folowing formula

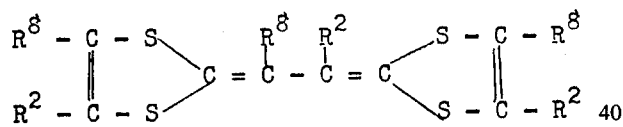

in which
R⁸ is a member of the group alkoxycarbonyl of up to 12 carbon atoms, aryloxycarbonyl of up to 13 carbon atoms, arylcarbonyl of up to 13 carbon atoms, or the cyano group; and
R² is either the same as R⁸ or hydrogen, a $C_1$–$C_5$ alkyl, aryl of up to 12 carbon atoms, or alkaryl of up to 12 carbon atoms.

8. A process for the preparation of a compound of the formula

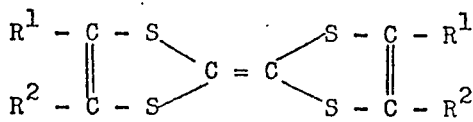

in which
R¹ is a member of the group alkoxycarbonyl of up to 12 carbon atoms, cycloxycarbonyl of up to 13 carbon atoms, lower perfluoroalkyl, arylcarbonyl of up to 13 carbon atoms, or the cyano group; and
R² is either the same as R¹ or hydrogen $C_1$–$C_5$ alkyl, aryl of up to 12 carbon atoms or aralkyl of up to 12 carbon atoms,
said process comprising the step of contacting a mixture consisting essentially of an acetylenic compound having the formula R¹C ≡ CR², in which R¹ and R² having the above-defined meaning, with carbon disulfide, and a lower alkanoic acid or haloalkanoic acid having a p Ka of less than about 5 in an amount of 0.1 to 3 moles per mole of said R¹C ≡ CR² at a temperature in the range of 30°–200°C.

9. A process of claim 8 wherein the temperature is maintained within the range of about 90°–150°C.

* * * * *